United States Patent
Moore

(10) Patent No.: US 6,428,072 B1
(45) Date of Patent: Aug. 6, 2002

(54) VEHICLE EQUIPMENT CONSOLE

(75) Inventor: John A. Moore, Salem, OR (US)

(73) Assignee: Auto Additions, Inc., Brooks, OR (US)

( * ) Notice: Subject to any disclaimer, the term of this patent is extended or adjusted under 35 U.S.C. 154(b) by 0 days.

(21) Appl. No.: 09/658,822

(22) Filed: Sep. 8, 2000

(51) Int. Cl.$^7$ .............................. B60R 7/04; B62D 25/14
(52) U.S. Cl. .................. 296/24.1; 296/37.8; 296/37.12; 296/70; 224/483
(58) Field of Search .............................. 296/24.1, 37.8, 296/37.12, 70, 74; 224/483

(56) References Cited

U.S. PATENT DOCUMENTS

| | | | | |
|---|---|---|---|---|
| 3,550,001 A | * | 12/1970 | Hanley | 445/90 |
| 3,984,161 A | * | 10/1976 | Johnson | 312/7 |
| 4,733,900 A | * | 3/1988 | Fluharty | 296/37.8 |
| 4,846,382 A | * | 7/1989 | Foultner et al. | 224/42.42 |
| 5,005,898 A | * | 4/1991 | Benedetto et al. | 296/194 |
| 5,174,621 A | * | 12/1992 | Anderson | 296/72 |
| 5,181,555 A | * | 1/1993 | Chruniak | 165/80.1 |
| 5,199,772 A | * | 4/1993 | Jordan | 312/7.1 |
| 5,282,556 A | * | 2/1994 | Bossert | 224/42.42 |
| 6,048,020 A | * | 4/2000 | Gronowicz et al. | 296/70 |
| 6,086,129 A | * | 7/2000 | Gray | 296/37.8 |
| 6,123,377 A | * | 9/2000 | Lecher et al. | 296/24.1 |

OTHER PUBLICATIONS

*Consolidator Consoles & Computer Mounts* . . . brochure, Havis Shields Equipment Corporation, Aug. 1996.
*1998 Solutions Manual*, Gamber–Johnson, pp. 4–17, 19–24, 38, 40, 46–48, 50–53, 55, 67, 69 and 71, 1998.
*The Mounting Guide 3$^{rd}$ Edition* brochure, Stewart Products, Inc., 1998–1999.

* cited by examiner

*Primary Examiner*—Stephen T. Gordon
*Assistant Examiner*—Greg Blankenship
(74) *Attorney, Agent, or Firm*—Kolisch Hartwell Dickinson McCormack & Heuser

(57) ABSTRACT

An equipment console for use in a vehicle having a driver compartment including a dashboard, floor and driver seat. The equipment console has a console body for supporting equipment in a location accessible to a person seated in the driver seat. The front of the console body includes a front portion configured to receive and support the equipment. The console body also has a back generally opposite the front of the console body. The back of the console body may be integrated with the dashboard by providing the back with a profile that conforms at least partially to a contour of the dashboard. In addition, the console body may be adapted to cover an area of the dashboard in which climate controls were originally installed, with an upper portion of the console body being adapted to receive and secure the climate controls in a relocated position so that they may be operated from the front of the console body.

20 Claims, 3 Drawing Sheets

VEHICLE EQUIPMENT CONSOLE

FIELD OF THE INVENTION

The present invention relates to an equipment console that may be mounted within a vehicle driver compartment to support equipment in a location easily accessible to a driver of the vehicle.

BACKGROUND OF THE INVENTION

Police officers, public safety officers, firefighters, paramedics and the like carry various types of equipment in their vehicles. Several pieces of equipment are often carried in a single vehicle, and the driver often needs to operate the equipment while simultaneously driving the vehicle. Thus, various devices exist to secure multiple pieces of equipment within a vehicle so that they are accessible to the driver and/or other persons in the vehicle driver compartment.

These devices commonly include a hollow rectangular box situated on the floor of the vehicle between the driver seat and front passenger seat, including a horizontal top portion having an upward-facing opening for receiving pieces of equipment. Police cruisers, for example, are commonly fitted with equipment boxes of this type. The boxes are used to house various types of equipment and controls used by police officers, such as radios, siren controls and light bar controls. Typically, the boxes are sized and positioned so that most of the box extends between the driver seat and the front seat. Only a small portion, if any, of the box will extend forward toward the dashboard beyond the driver seat and front passenger seat. In some police cruisers, the equipment box extends all the way back to the prisoner partition separating the rear seating area from the driver compartment. A laptop computer is often positioned between the box and dashboard, and is secured to the vehicle floor with various types of mounting hardware.

Systems employing the conventional equipment box described above suffer from a number of problems associated with the position of the box within the vehicle driver compartment. First, the box is located to the side of the driver, instead of to the front of the driver near the dashboard. This requires the driver to rotate their upper body and reach back slightly to operate equipment housed in the box. The housed equipment is also well out of the driver's line of sight, requiring the driver to look over and down between the seats to see the equipment and controls mounted in the box. This is particularly a problem in vehicles having sirens and light bars, as the controls for these devices typically have several buttons and switches.

In addition, the location of the conventional equipment box can interfere with movements of the driver and passengers, and with the operation and storage of other equipment. For example, in a police cruiser, the area between the front seats immediately in front of the prisoner partition is often used to store a shotgun. The conventional equipment box configuration described above makes it more difficult to store and remove a shotgun from this area. The configuration also limits space between the seats that otherwise would be available to store other types of equipment, such as a flashlight, flashlight charger, cell phone, etc. Finally, the box and the equipment mounted to the box can obstruct arm movement of the driver and front seat passenger.

SUMMARY OF THE INVENTION

The present invention provides a vehicle equipment console for use in a vehicle driver compartment having a dashboard, floor and driver seat. The equipment console includes a console body for supporting equipment in a location accessible to a driver seated in the driver seat. The console body includes a front portion configured to receive and support the equipment, and a back generally opposite the front portion. The back of the console body may be integrated with the dashboard by shaping the back of the console body to have a profile that conforms at least partially to a contour of the dashboard. The console body may also be configured to cover an area of the dashboard in which climate controls were originally installed, with an upper portion of the console body being adapted to receive and secure the climate controls in a relocated position so that they may be operated from the front of the console body.

DETAILED DESCRIPTION OF THE INVENTION

Figure 1:
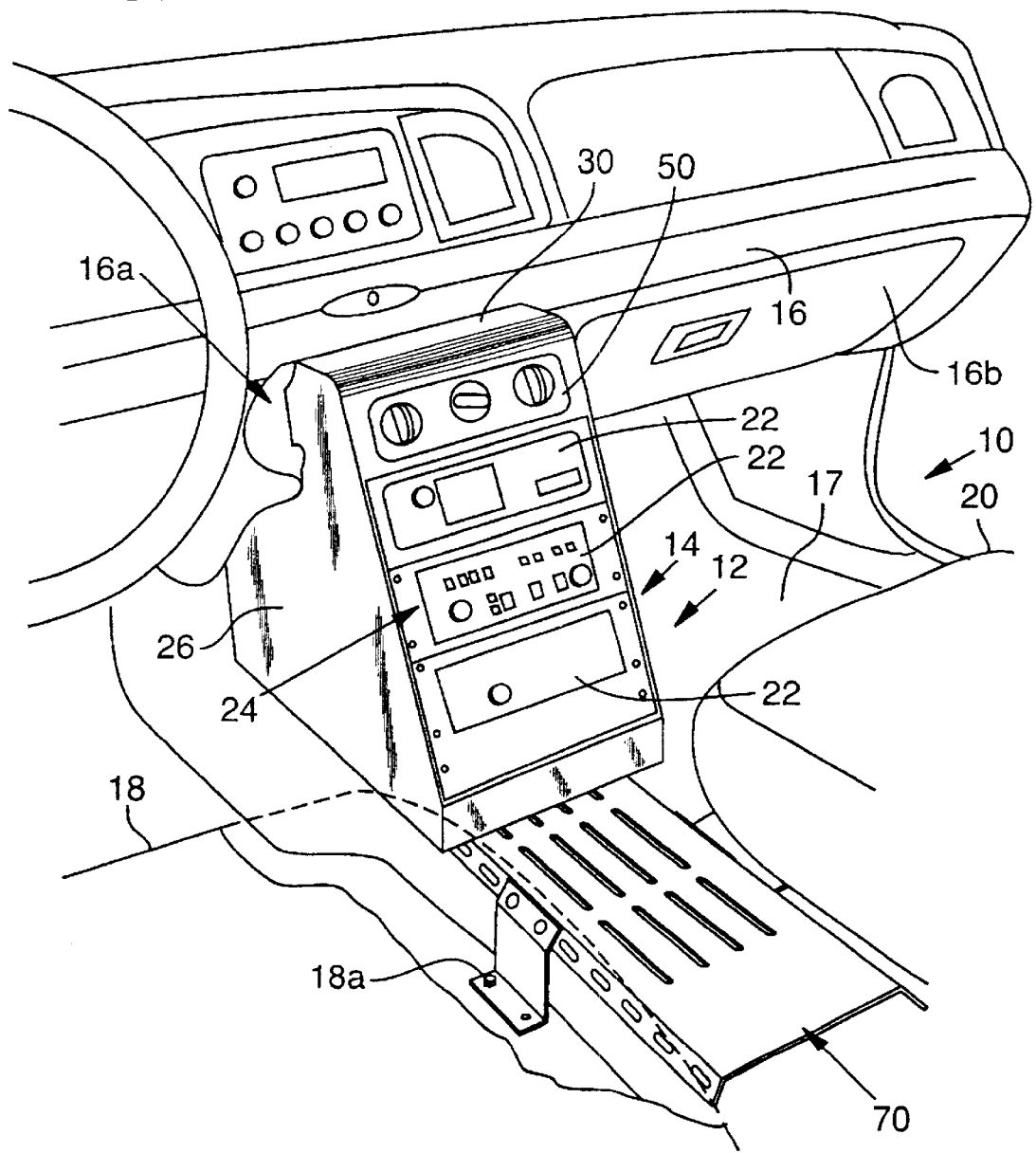
FIG. 1 is a view of a driver compartment of a vehicle, including an equipment console according to the present invention.

FIG. 1 depicts a vehicle driver compartment 10 in which an equipment console 12 according to the present invention is installed. Equipment console 12 typically is provided as an aftermarket unit that may easily be retrofitted to driver compartment 10. Equipment console may be configured for installation into virtually any type of vehicle, though it is particularly useful when installed in vehicles used by police and public safety officers, firefighters and the like. This is due to the extensive amount of electronic and other equipment normally carried in these vehicles. For purposes of illustration only, equipment console 12 will be described in the context of a police cruiser.

As seen in FIG. 1, equipment console 12 includes a console body 14 situated generally in a central region of vehicle driver compartment 10 in the space between dashboard 16 and the front edges of driver seat 18 and front passenger seat 20. Console body 14 is configured so that multiple pieces of equipment 22 may be mounted to a front region 24 of the console body. Equipment 22 may include a radio, siren controls, light bar controls, and various other types of equipment used in police cruisers. Console 12 is configured so that equipment 22 is easily accessible to persons seated in driver seat 18 and passenger seat 20. Console 12 uses a minimum amount of space within driver compartment 10, and thus does not interfere with driver and passenger movements, or with the storage and operation of other equipment within the vehicle driver compartment.

Figure 2:
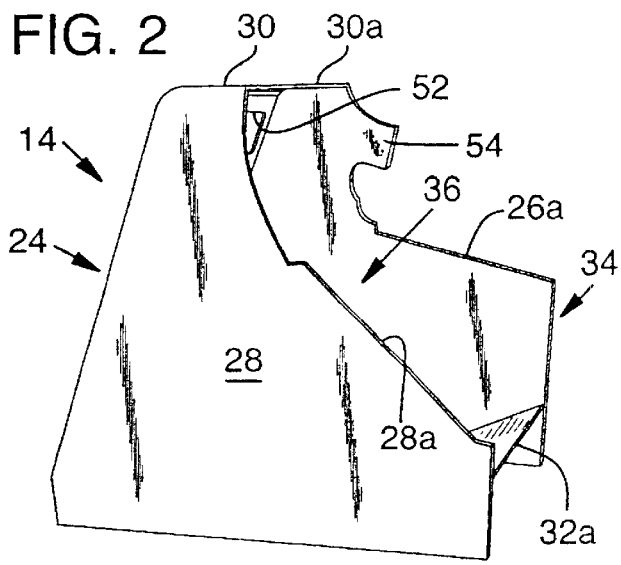
FIG. 2 is an isometric view of a console body included with the equipment console shown in FIG. 1.
Figure 3:
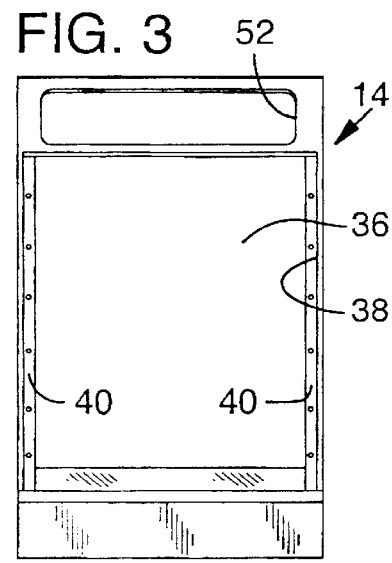
FIG. 3 is a front view of the console body shown in FIG. 2.
Figure 4:
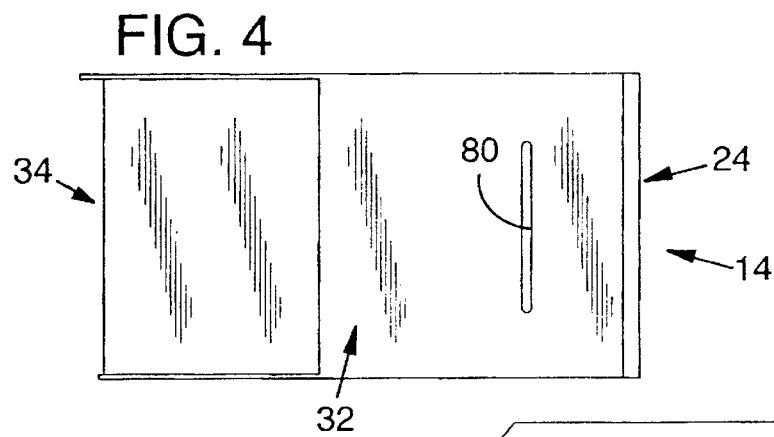
FIG. 4 is a bottom view of the console body shown in FIG. 2.

FIG. 2 is an isometric view showing side and back portions of console body 14, and FIG. 3 is a front view of the console body. As should be appreciated from FIGS. 1–3, console body 14 may variously be thought of as a box, rack, case or frame for supporting equipment such as equipment 22. The console body is typically formed from 16-gauge cold-rolled steel, but may be made from a variety of other materials, as desired. In addition to front 24, console body 14 typically includes sides 26 and 28, top 30, bottom 32 (FIG. 4) and back 34. When installed as shown in FIG. 1, the console body and portions of driver compartment 10 cooperate to at least partially enclose a hollow interior region 36 of the console body. Hollow interior 36 is best seen with reference to FIG. 2.

As shown in FIG. 3, front 24 includes an opening 38 which communicates with hollow interior region 36, and through which equipment 22 may be received for mounting to the console body. Mounting structures in the form of elongate mounting flanges 40 are provided on front 24 adjacent opening 38. Flanges 40 are provided with a number of holes to facilitate mounting of equipment 22 to the front of the console body with bolts, screws or other suitable fasteners.

As seen in FIG. 1, equipment 22, once mounted on console body 14, covers opening 38 and extends at least partially into hollow interior region 36 enclosed by the console body. The front faces of equipment 22 define a generally planar instrument panel that may be operated from the front of the console body. When console body 14 is mounted within vehicle driver compartment 10, the front of the console body and instrument panel are generally vertical, but tilted slightly toward dashboard 16 so that they face upward for easy viewing and operation by persons seated in seats 18 and 20. Typically, the front of the console body is angled no more than 45 degrees away from a completely vertical orientation, though it may be angled further, and may even be completely horizontal.

As seen in FIG. 1, console body 14 is configured to cover an area 16a of dashboard 16 which would normally house various factory-installed climate controls (heat, fans, air conditioning, etc.). In the depicted equipment console, however, factory-installed climate control panel 50 has been pulled out of dashboard 16, threaded through the console body, and relocated on the front of the console body. The front of console body 14 includes an upper opening 52 (FIG. 3) that is specially sized to permit mounting of climate control panel 50 adjacent opening 52. When relocated to the depicted position, the climate controls may be operated from the front of the console body. The back of the console body includes a protruding tab 54 (FIG. 2) configured to extend into the dashboard where the climate control panel was originally installed. Tab 54 aids in securing the console body in a fixed position relative to the dashboard and interior of the vehicle.

Console body 14 preferably is sized to be compact and is situated close to dashboard 16. Sides 26 and 28 extend parallel to each other between front 24 and back 34 of console body 14, and are dimensioned so that the depth of the unit, as measured from back 34 to front 24, is no greater than necessary to accommodate equipment 22. Not only is depth minimized, but the console body is also situated in a forward position so that back 34 of console body is close to, or in contact with a portion of dashboard 16. As seen in FIG. 1, no part of the console body extends beyond the mounting hardware (e.g., seat mounting bolt 18a) used to secure seats 18 and 20 to the floor. In this configuration, the console body normally will not extend beyond the front edges of the seats unless they are adjusted to an extreme forward position. If the console body does extend away from the dashboard to occupy some of the space between the seats, it is normally desirable that this be minimized. Sides 26 and 28 are similarly spaced by front 24 of the console body to accommodate equipment 22 while minimizing the width of the console body. Equipment console 12 typically rests on the floor of the vehicle, and the position of dashboard 16 relative to floor 17 therefore governs the height of the console body, as measured between top 30 and bottom 32.

As will now be explained with reference to FIGS. 1 and 2, back 34 of console body 14 may be integrated with dashboard 16 by closely spacing the console body from the dashboard and conforming a portion of the console body to the shape of the dashboard. Back 34 of the console body is defined by back edges 30a, 26a, 28a and 32a of the sidewall members that form top 30, sides 26 and 28, and bottom 32 of the console body. A portion of the back is provided with a profile so that, when installed, the console body conforms to a portion of dashboard 16. This is achieved by shaping or forming back edges 26a and 28a so that the contour of each edge at least partly follows the contour of the dashboard. More particularly, edge 28a is positioned near the dashboard on the passenger side of compartment in a region adjacent glovebox door 16b. Edge 28a is formed with a profile, or contour, that conforms to that portion of the dashboard. Edge 26a is similarly configured to conform to a portion of dashboard 16 on the driver side. As should be appreciated from FIGS. 1 and 2, the vehicle dashboard may have an irregular cross section including curved portions, and the cross section may vary along the length of the dashboard. Thus, conforming the back of console body 14 to the dashboard may result in edges 26a and 28a being shaped differently to have different profiles, as seen in FIG. 2.

As seen in FIGS. 1 and 2, console body 14 is generally wedge-shaped, with sides 26 and 28 generally tapering toward top 30 such that the depth of the console body is greater at bottom 32. This is due in part to the tilted configuration of the front face of the console body. In addition, the lower portions of sides 26 and 28 are sized to extend underneath the dashboard, as seen in FIG. 1. This further integrates equipment console 12 with the dashboard and encloses and conceals wiring associated with equipment 22.

A number of advantages result from the compact construction of console body 14 and its position close to dashboard 16. In general, this configuration leaves the space between seats 18 and 20 free for other uses and allows for more efficient use of space within vehicle driver compartment 10. Unlike conventional equipment boxes, which are mounted between the seats, equipment console 12 does not restrict arm movement of the driver and front seat passenger. Shotguns, rifles, flashlights, portable loudspeakers, telephones and various other equipment may be stored in the space between the seats and operated without obstruction or interference from equipment console 12.

Equipment mounted in console body 14 also is clearly visible and easily accessible to persons seated in seats 18 and 20. The front face of the console body is generally vertical, but is angled toward the dashboard so that the instrument panel defined by equipment 22 faces upward toward seats 18 and 20. Typically, the front face is angled so that every point along the height of console front 24, as measured from top 30 to bottom 32, is approximately the same distance from the driver's eyes. Also the front of the instrument panel is close to the driver's line of sight when driving, particularly relative to the space between seats 18 and 20, where conventional equipment boxes are installed. The driver need only glance slightly downward to the right to view the equipment mounted in the console body. Also, the console body is close to the steering wheel, allowing the driver to easily reach over a short distance to operate equipment 22.

Unlike with the conventional equipment box mounted between the seats, equipment console 12 allows equipment 22 to be easily viewed and operated by the driver without substantial upper body and head movements.

Figure 5A:
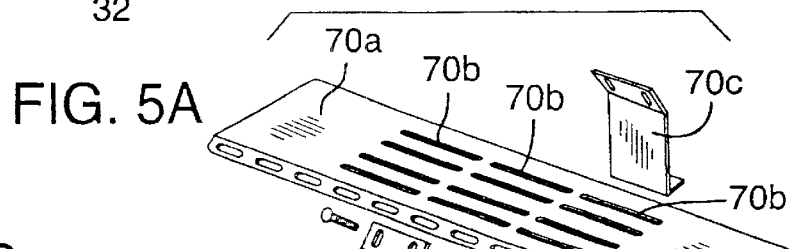
FIG. 5 is an isometric view of a floor plate included with the equipment console shown in FIG. 1.

Referring now to FIGS. 1, 4, 5A and 5B, a device and method for mounting console body 14 in vehicle compartment 10 will be described. As seen in FIGS. 1 and 5A, a floor plate 70 extends between the driver seat and front passenger seat, and is positioned so that end 70a is positioned underneath and fastened to console body 14. Floor plate 70 includes a generally planar body having a number of elongate slots 70b, and mounting legs 70c that may be secured in various desired locations along the length of the body. Floor plate 70 is mounted within vehicle compartment 10 by fastening ends 70d of the mounting legs to the vehicle floor using the factory-installed mounting hardware (e.g., seat mounting bolt 18A) that secure seats 18 and 20 to the floor.

Console body 14 is mounted within the vehicle by aligning an elongate slot 80 formed on bottom 32 of the console body (FIG. 4) with one set of the elongate slots provided on the body of floor plate 70. The console body and floor plate are then secured together via the aligned slots with a suitable fastener. In the embodiment depicted in FIG. 1, console body 14 is secured in place only by floor plate 70 and tab 54, no other fastening mechanism is used. Additional fasteners may be provided as desired, however, to further secure equipment console within vehicle compartment 10.

Figure 5B:
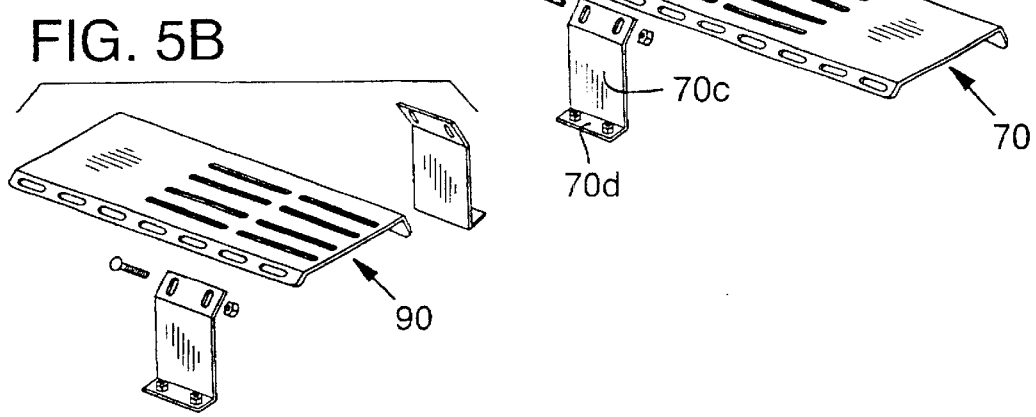

As revealed by the alternately configured floor plate 90 shown in FIG. 5B, the floor plate may be formed in a variety of different lengths. Longer floor plates may be formed to extend between the seats all the way to the prisoner partition, providing a surface for mounting and/or storing other equipment. Alternatively, space between the seats may be left uncovered by using a short floor plate, such as that depicted in FIG. 5B. As a further alternative, the floor plate may be omitted altogether, and the mounting legs shown in FIGS. 5A and 5B may be modified to attach directly to the bottom of the console body.

Figure 6:
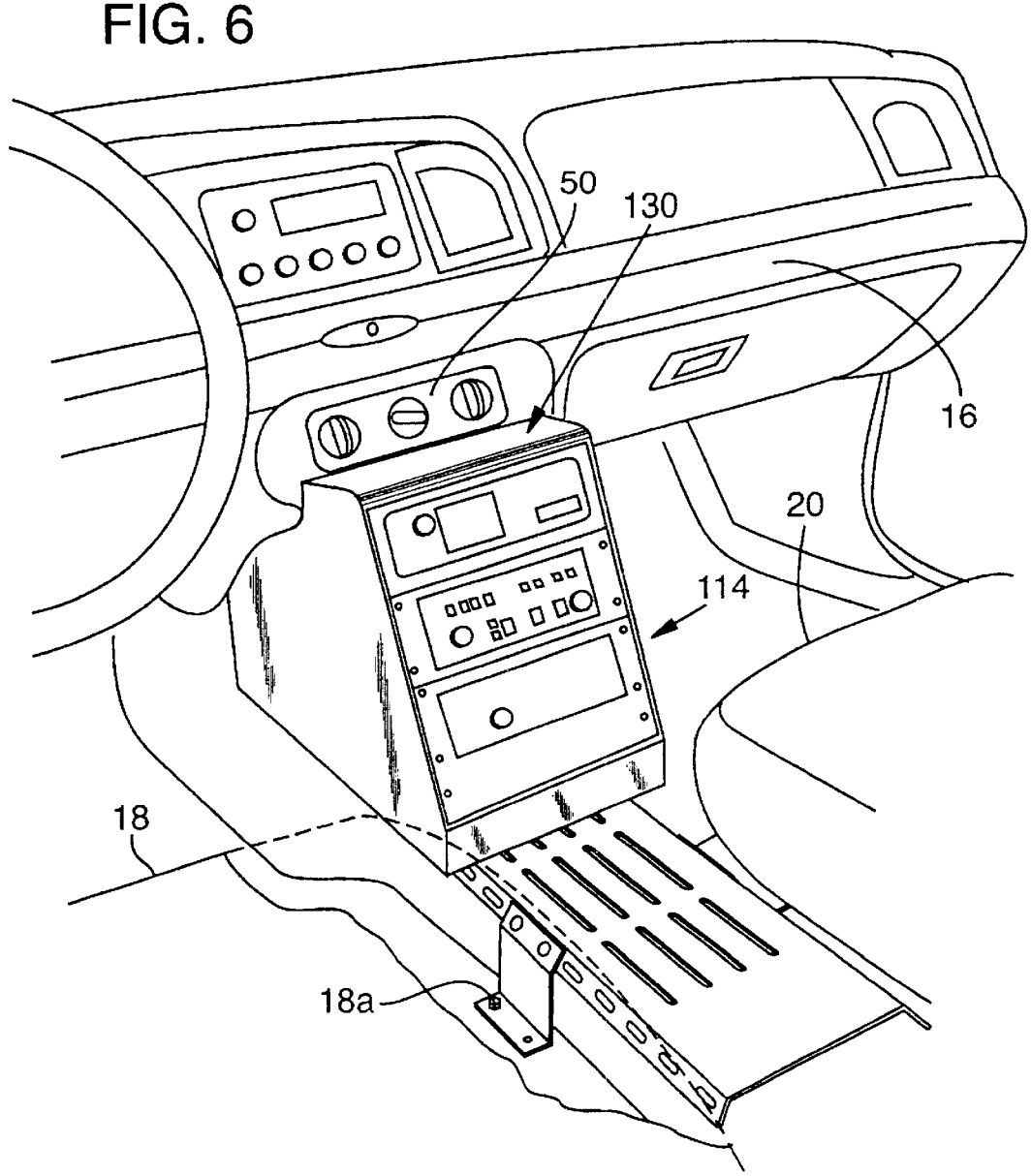
FIG. 6 is a view of the driver compartment shown in FIG. 1, including an alternate embodiment of an equipment console according to the present invention.

Referring now to FIG. 6, another embodiment of an equipment console according to the present invention is shown, having an alternately configured console body 114. Console body 114 is similar to the console body described with reference to FIGS. 1–4, except that it is configured to be installed without relocating the factory-installed climate control panel 50. To achieve this, top portion 130 of console body 114 is modified from the previously described configuration so that it abuts dashboard 16 just below climate control panel 50. Equipment console 114 thus permits free access to climate controls in their original factory-installed location in the dashboard. The depicted configuration also simplifies installation by eliminating the need to relocate climate control panel 50.

While the present invention has been particularly shown and described with reference to the foregoing preferred embodiments, those skilled in the art will understand that many variations may be made therein without departing from the spirit and scope of the invention as defined in the following claims. The description of the invention should be understood to include all novel and non-obvious combinations of elements described herein, and claims may be presented in this or a later application to any novel and non-obvious combination of these elements. The foregoing embodiments are illustrative, and no single feature or element is essential to all possible combinations that may be claimed in this or a later application. Where the claims recite "a" or "a first" element or the equivalent thereof, such claims should be understood to include incorporation of one or more such elements, neither requiring nor excluding two or more such elements.

I claim:

1. An equipment console for use in a vehicle driver compartment having a dashboard, floor and driver seat, the equipment console comprising:
   a console body configured to support add-on equipment in a location accessible to a driver seated in the driver seat when the equipment console is installed within the vehicle driver compartment, the console body having:
      a front, including a mounting frame configured to receive and support the add-on equipment; and
      a back generally opposite the front, the back having a profile that conforms at least partially to a contour of the dashboard, where the console body is configured to cover an area of the dashboard in which climate controls were originally installed, and where an upper portion of the console body is adapted to receive and secure the climate controls in a relocated position so that they may be operated from the front of the console body; and
   a floor plate configured to be mounted within the vehicle driver compartment so that the floor plate extends adjacent the floor between the driver seat and a passenger seat included in the vehicle driver compartment, where a front end of the floor plate is secured to a bottom of the console body.

2. The equipment console of claim 1, where the console body further includes two sides that are spaced from each other by the front of the console body and that each extend from the front of the console body toward the back of the console body.

3. The equipment console of claim 2, where the two sides are each formed as a sidewall having a back edge that partly defines the back of the console body.

4. The equipment console of claim 3, where the back edges of the sidewalls are shaped to at least partially conform to a dashboard having an irregular curved cross section.

5. The equipment console of claim 4, where a first one of the back edges of the sidewalls is shaped differently than a second one of the back edges of the sidewalls, enabling the back edges of sidewalls to be closely fitted to a dashboard having a cross section that varies along the length of the dashboard.

6. The equipment console of claim 1, where the back of the console body is shaped to at least partially conform to a dashboard having an irregular curved cross section.

7. The equipment console of claim 1, where the back of the console body includes a protruding tab configured to extend into the area of a dashboard in which climate controls were originally installed.

8. The equipment console of claim 1, where the front of the console body is generally vertical, but is configured so that, when the equipment console is installed in a vehicle, the front of the console body is angled toward the dashboard so that the front of the console body faces upward toward the driver seat.

9. An aftermarket equipment console for use in a vehicle driver compartment having a dashboard, floor and driver seat, the equipment console comprising:
   a console body configured for aftermarket installation into a vehicle, the console body having:
      a front configured to receive and support multiple pieces of add-on equipment so that front faces of the pieces of add-on equipment define a generally planar instrument panel operable from the front of the console body; and a back shaped to integrate the equipment console with the dashboard, where the console body is proportioned so that, when the console body is installed in the vehicle, the instrument panel is located entirely forward of mounting hardware used to secure the driver seat to the floor; and a floor plate configured to be mounted within the vehicle driver compartment so that the floor plate extends adjacent the floor between the driver seat and a passenger seat included in the vehicle driver compartment, where a front end of the floor plate is secured to a bottom of the console body.

10. The aftermarket equipment console of claim 9, where the back of the console body is shaped to at least partially conform to a dashboard having an irregular cross section.

11. The aftermarket equipment console of claim 9, where the back of the console body includes two elongate edge portions shaped to at least partially conform to a dashboard having in irregular curved cross section.

12. The aftermarket equipment console of claim 11, where a first one of the elongate edge portions is shaped differently than a second one of the elongate edge portions, enabling the back of the console body to be closely fitted to a dashboard having a cross section that varies along the length of the dashboard.

13. The aftermarket equipment console of claim 9, where:
the console body further includes two spaced sidewalls that extend generally parallel to each other between the front and back of the console body; and
the front, back and sidewalls of the console body partly define a generally wedge-shaped case including a shallow top and a deeper bottom, depth being measured between the front and back of the console body.

14. The aftermarket equipment console of claim 13, where the sidewalls of the console body each include a back edge configured to at least partially conform to an irregular curved cross section of a dashboard.

15. The aftermarket equipment console of claim 9, where the console body is configured to cover an area of a dashboard in which climate controls were originally installed, and where the console body is adapted to receive and secure the climate controls in a relocated position so that the climate controls are operable from the front of the console body.

16. The aftermarket equipment console of claim 15, where the back of the console body includes a protruding tab configured to extend into an area of a dashboard in which the climate controls were originally installed.

17. The aftermarket equipment console of claim 9, where the back of the console body is positioned so that it contacts or is closely spaced from a central portion of a dashboard, while permitting free access to climate controls in an original factory-installed location of the climate controls on the dashboard.

18. The aftermarket equipment console of claim 9, where the front of the console body is shaped so that, when the console body is installed in a vehicle driver compartment, the instrument panel is generally vertical but angled toward the dashboard so that the instrument panel faces upward toward the driver seat.

19. An equipment console for use in a vehicle driver compartment having a dashboard, floor and driver seat, the equipment console comprising:

a generally wedge-shaped equipment case integrated with and extending outward from the dashboard, the equipment case including:
a front configured to receive and support multiple pieces of add-on equipment so that front faces of the pieces of add-on equipment define a generally planar instrument panel operable from the front of the equipment case; and
two sides spaced from each other and extending parallel to each other from the front of the equipment case, the sides each including an elongate back edge portion generally opposite the front of the equipment case, where each elongate edge portion is shaped to conform to a cross section of the dashboard, where the equipment case is proportioned so that the instrument panel is entirely forward of mounting hardware used to secure the driver seat to the floor, and where the equipment case covers an area of the dashboard in which climate controls were originally installed, an upper portion of the equipment case being adapted to receive and secure the climate controls in a relocated position so that the climate controls are operable from the front of the console body equipment case; and a floor plate configured to be mounted within the vehicle driver compartment so that the floor plate extends adjacent the floor between the driver seat and a passenger seat included in the vehicle driver compartment, where a front end of the floor plate is secured to a bottom of the equipment case.

20. An automobile, comprising:
a driver compartment having a dashboard, floor and driver seat; and
a console installed in the driver compartment and having
a console body for supporting add-on equipment in a location accessible to a driver seated in the driver seat, the console body having:
a front, including a mounting frame configured to receive and support the add-on equipment; and
a back generally opposite the front, the back having a profile that conforms at least partially to a contour of the dashboard, where the console body covers an area of the dashboard in which climate controls were originally installed, and where an upper portion of the console body is adapted to receive and secure the climate controls in a relocated position so that they may be operated from the front of the console body; and
a floor plate configured to be mounted within the driver compartment so that the floor plate extends adjacent the floor between the driver seat and a passenger seat included in the driver compartment, where a front end of the floor plate is secured to a bottom of the console body.

* * * * *